United States Patent [19]
Freeman et al.

[11] Patent Number: 6,070,226
[45] Date of Patent: May 30, 2000

[54] MEMORY SYSTEM HAVING MAGNETIC DISK DRIVE IMPLEMENTED AS CACHE MEMORY AND BEING INTEGRATED WITH OPTICAL DISK DRIVE IN A HIERARCHICAL ARCHITECTURE

[75] Inventors: Martin Freeman, Palo Alto; Uzi Y. Bar-Gadda, Menlo Park, both of Calif.

[73] Assignee: Philips Electronics North America Corporation, New York, N.Y.

[21] Appl. No.: 08/762,512

[22] Filed: Dec. 10, 1996

[51] Int. Cl.[7] .................................................. G06F 12/00
[52] U.S. Cl. ............................ 711/117; 711/4; 711/101; 711/104
[58] Field of Search ........................ 369/18, 261, 275.3; 360/99.01; 711/4, 101, 104, 105, 112, 113, 117, 118, 122, 154

[56] References Cited

U.S. PATENT DOCUMENTS

| | | | |
|---|---|---|---|
| 4,467,421 | 8/1984 | White ....................................... | 711/118 |
| 4,953,122 | 8/1990 | Williams ...................................... | 711/4 |
| 4,963,995 | 10/1990 | Lang .......................................... | 386/54 |
| 4,974,156 | 11/1990 | Harding .................................. | 711/162 |
| 4,974,197 | 11/1990 | Blount et al. ....................... | 295/200.14 |
| 4,987,533 | 1/1991 | Clark et al. .............................. | 707/204 |
| 5,012,407 | 4/1991 | Finn ........................................ | 711/117 |
| 5,034,914 | 7/1991 | Osterlund ................................ | 395/872 |
| 5,179,658 | 1/1993 | Izawa ....................................... | 345/508 |
| 5,218,685 | 6/1993 | Jones ....................................... | 711/160 |
| 5,313,612 | 5/1994 | Satoh et al. ............................. | 711/162 |
| 5,313,617 | 5/1994 | Nakano et al. ......................... | 395/500 |
| 5,438,674 | 8/1995 | Keele et al. ................................ | 711/4 |
| 5,457,796 | 10/1995 | Thompson .............................. | 707/203 |
| 5,493,676 | 2/1996 | Amundson ......................... | 395/183.18 |
| 5,566,316 | 10/1996 | Fechner et al. ......................... | 711/114 |

FOREIGN PATENT DOCUMENTS

| | | | |
|---|---|---|---|
| 0260722 | 3/1988 | European Pat. Off. ........ | G11B 21/10 |
| 0357464A2 | 3/1990 | European Pat. Off. ........ | G06F 12/08 |
| 0466389A2 | 1/1992 | European Pat. Off. ........ | G06F 11/14 |
| 0675488 | 10/1995 | European Pat. Off. .......... | G11B 7/00 |
| 0762756 | 3/1997 | European Pat. Off. ....... | H04N 5/775 |

*Primary Examiner*—Tuan V. Thai
*Attorney, Agent, or Firm*—Peter Verdonk

[57] ABSTRACT

A data processing system with an optical disk drive is provided with a magnetic disk drive as a cache. The magnetic disk drive is physically integrated with the optical disk drive. A semiconductor RAM is provided as a further cache for the magnetic disk drive and is physically integrated therewith.

8 Claims, 2 Drawing Sheets

| COMMAND | CONTROL | STORAGE LEVEL$_s$ | DATA LOCATION$_s$ | STORAGE LEVEL$_d$ | DATA LOCATION$_d$ | XFER COUNT |

300

MEMORY SYSTEM HAVING MAGNETIC DISK DRIVE IMPLEMENTED AS CACHE MEMORY AND BEING INTEGRATED WITH OPTICAL DISK DRIVE IN A HIERARCHICAL ARCHITECTURE

FIELD OF THE INVENTION

The invention relates to a data processing system for selectively retrieving data from a storage comprising an optical disk. The invention relates in particular, but not exclusively, to a consumer electronics system.

BACKGROUND ART

Aggressive development of magnetic disk drive technology has opened up a performance gap between optical and magnetic storage data rates, seek times, rotational latencies, etc. Some optical drive technology has an order of magnitude difference in performance from its magnetic drive technology counterpart. For instance, CDROM data transfer rates are typically 9 megabits/second, while typical magnetic disk drive data transfer rates are more like 9 megabytes/second. Also, typical CDROM seek times are more like 0.2 seconds, while magnetic disk drive seek times are down to 8 milliseconds and dropping.

Today's multimedia PC's use CDROM as a major source of multimedia input. Interactive learning and interactive games can be achieved using this means. However, the data rate and the seek times of a CDROM conspire to cause the user to wait an inordinately long amount of time to access information from a different portion of the optical disk.

OBJECT OF THE INVENTION

It is an object of the invention to provide a system that mitigates the latency involved in using an optical disk storage medium with interactive software applications.

SUMMARY OF THE INVENTION

To this end, the invention provides a data processing system with a hierarchical memory. The memory comprises at least a single memory module. The module has a plurality of memory units. Each respective one of the memory units represents a respective level in the hierarchy. Each specific one of the memory units is physically integrated with a particular memory unit of the next higher level. Among the memory units there are an optical disk drive and at least one magnetic disk drive. The magnetic disk drive serves as a read cache for the optical disk drive. The magnetic disk drive is physically integrated with the optical disk drive.

The inventors have realized that providing a consumer electronics system with such a memory hierarchy solves the problem of unacceptable latency inherent in optical disk storage. The concept of memory hierarchy allows the matching of higher capacity, lower speed storage to lower capacity, higher speed storage in order to achieve high-speed storage data rates with high storage capacity. In a memory hierarchy, higher data transfer rates are achieved by staging data in progressively faster, smaller storage with the fastest and smallest storage interfacing directly to the processor. Using a small capacity, higher performance magnetic disk drive as a staging device for a lower performance, higher capacity optical disk drive like a CDROM offers performance advantages.

There are several ways of controlling this staging device. These ways include a transparent caching strategy where the next level up in the memory hierarchy only sees a faster acting optical disk drive, and a program controlled strategy where the software actually manages the accessing and the movement of data between the magnetic and optical disk drives.

If data to be accessed is found on the magnetic disk drive, the data access occurs at magnetic disk drive rates. Otherwise, the data must be fetched from the optical disk drive and also written to the magnetic disk drive in the expectation of future re-use. While initial accesses to information on the combined pair may be slow, as data becomes populated on the magnetic disk drive, the access times will improve to an acceptable level. Applications knowing about the memory hierarchy can take advantage of its capabilities even more by pre-fetching data and program that have a high probability of being required in the future. Thus, if a branch condition determines which of two different data accesses to make, having pre-fetched both program/data segments previously provides the highest performance.

Some applications might want to view a movie recorded on a CDROM. Here the staging device does little good, since there is no repetition of access and no problem with seeking (seek time=0). The staging device does come in handy when the data transfer rate is high, but the seek time is long for the optical storage device. Here, the spacial locality of consecutive data helps being able to provide data from the magnetic disk drive while staging in the next sequence of data from the optical disk drive.

Nowadays, small form-factor magnetic disk drives are available hardly larger than the size of semiconductor chip packages. These magnetic drives can be mounted on the internal control board of optical disk drives. Thus, a single storage module with physically integrated optical and magnetic disk drives provides a modular building block for, or a slice of, a storage hierarchy. In order to carry the physically integrated memory hierarchy a step further, these small magnetic disk drives themselves may contain a semiconductor cache memory, thus providing a three-stage hierarchy. A set of such storage modules can be combined to make a storage hierarchy with special properties. A generalization of this approach might have important performance advantages. A configuration may have multiple small form-factor magnetic disk drives preceding multiple optical disk drives. Disk array striping and accessing techniques can be applied here to increase the data transfer rate. For instance, striping data across two 9 megabit/second CDROM drives and accessing them in parallel yields an aggregate data transfer rate of 18 megabits/second. This data can itself be an element of a stripe in a magnetic disk drive array in the preceding stage in the memory hierarchy. Advantage accrues when several data accesses occur in parallel. There is always the high probability that there will be at least one magnetic disk drive that has the required data and is ready to provide it.

It is to be understood that where reference is being made to CDROM, this is also meant to cover other types of optical disks, for example, CD-I or CD-ReWriteable, as data storage. Also, one or more magnetic disk drives can be physically integrated with an optical disk drive to enable for example multi-user interaction.

A further generalization concerns a data processing system with a hierarchy of data storage units, wherein each particular unit is physically integrated with, i.e., incorporated in or mounted in, a unit of the next lower level. Consider, for example, a hierarchy with a magnetic tape drive at the lowest level. Next higher levels may include, in increasing order, one or more of the following: an optical disk drive for a re-writable optical disk (CD-ReWritable), a magnetic disk drive, a semiconductor RAM, wherein each of the units employed is integrated with a unit of the next lower level. The physically small-sized storage units, nowadays available, and their decreasing costs render them highly suitable to be used as storage modules for custom-tailored data processing systems, specifically in the consumer electronics market and specifically for hand-held devices.

For the sake of completeness, reference is made to U.S. Pat. No. 4,974,156 issued to Harding et al., and to European Patent Application EP-A 0 466 389 of Thompson.

Harding et al. disclose a professional WORM system for recording extremely large quantities of data. The WORM system has a multi-level data storage hierarchy, wherein the top level contains magnetic disk drives for receiving data objects, and the bottom level consists of shelves with optical disks storing the data objects. Upon receipt of a data object, copies thereof are stored at diverse levels. Upon a request for retrieval, a copy will be fetched from the level giving the shortest access time. The present invention differs from the Harding system in, among things, that the invention is neither concerned with WORM systems, nor with permanently storing the same copies at different levels in the hierarchy, nor with the handling of massive quantities of data as in professional WORM systems for archiving purposes. In contrast, the invention relates to a modular memory architecture involving an optical disk as a storage, wherein latency should be negligible, and wherein the magnetic disk drive serves as a read cache physically integrated with the optical disk drive. This is specifically relevant to interactive software applications in the consumer electronics field in view of latency issues.

Thompson also relates to a professional WORM system for automatically creating back-up files in computer systems. The system uses a WORM device with a write-once optical disk, and a mass storage device with a magnetic disk drive. The storage is characterized into three classes: yet to be used, read/write, and read-only. Each storage class is associated with a part of the file address space. Storage elements residing in the yet to be used address space are moved to the read/write address space when the element is used to store a data element. When that data element is backed up it becomes part of the read-only address space. Basically, the read/write data is located on the magnetic disk drive and the read-only data is located on the WORM drive. Read-only data is being cached by the magnetic disk drive for the WORM device. Thus the magnetic disk drive functions as a write cache. The present invention differs from the Thompson system in that the invention is neither concerned with the handling of data for automatically creating back-up files in a computer system, nor with a WORM device for archiving purposes. The invention relates to the physical integration of various storage levels with one another to provide a modular memory architecture, typically for desk top, lap top, or hand held apparatus. Typically, the invention relates to the field of consumer electronics, and more particularly, to the field of interactive software applications involving an optical disk as a storage, wherein latency should be imperceptible. The requirements posed on latency in a real-time applications, such as in an interactive video game, are much tighter than posed on professional archiving WORM systems. The physical integration of a read cache magnetic disk drive with an optical disk drive is one of the factors that reduce latency and that enables to build compact data processing systems, such as for consumer electronics applications.

BRIEF DESCRIPTION OF THE DRAWINGS

The invention is explained, in further detail and by way of example, with reference to the accompanying drawings, wherein.

Throughout the figures, same reference numerals indicate similar or corresponding features.

PREFERRED EMBODIMENTS

Block Diagram System

Figure 1:
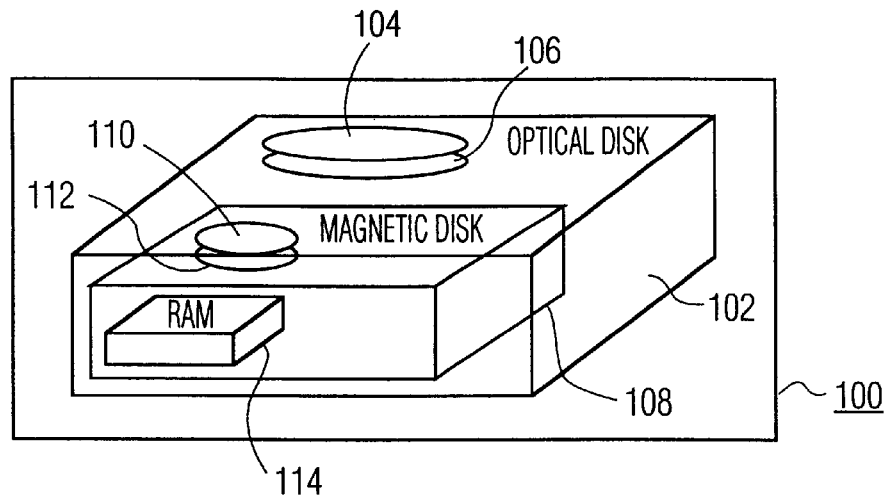
FIG. 1 is a block diagram of a system with a memory hierarchy in the invention.

FIG. 1 is a block diagram of a system 100 according to the invention. System 100 has a data storage with a memory hierarchy as explained above. System comprises a unit 102 comprising an optical disk drive for optical disks 104 and 106. Embedded in unit 102 is a unit 108 comprising a magnetic disk drive for magnetic disks 110 and 112. Embedded within unit 108 is a unit 114 comprising a semiconductor RAM. The storage levels are embedded in one another. There is no adapter card, and cables are not required. One or more small form-factor magnetic disk drive units 108 are directly attached to the internal circuit board (not shown) of optical disk drive unit 102, just as one or more of units 114 with RAM chips are connected to the internal circuit board (not shown) of magnetic disk drive unit 108.

The storage hierarchy can be used in an interactive video application. In this application, an optical read/only CD or CD-ROM and a magnetic disk drive comprise the storage hierarchy. CD-ROM drives typically have access times of 200–500 ms and data transfer rates of 1.5–9 megabits/second. Thus, for a 500 ms access time at 9 megabits/second, there should be a 4.5 megabit video segment on the magnetic disk drive. At an appropriate decision point in an interactive session, there is the possibility of several choices to branch to besides a default condition where there is no branching at all. If the first 4.5 megabits of each video alternative are on the disk drive, then the host system can play the appropriate choice while the CD-ROM moves to the selected next scene. When the video on the disk drive has been viewed the video stream from the CD-ROM should be ready to be seen without any delay.

For more advanced, higher performance systems with one or more users, this technique can be extended with the addition of extra storage hierarchy slices where data may be striped across slices. This provides an access bandwidth of the number of slices times the bandwidth per slice. This technique need not be restricted to the case of a three level storage hierarchy, an N-level storage hierarchy is possible, as long as storage level I is embedded in storage level I+1.

Sliced Memory Hierarchy

Figure 2:
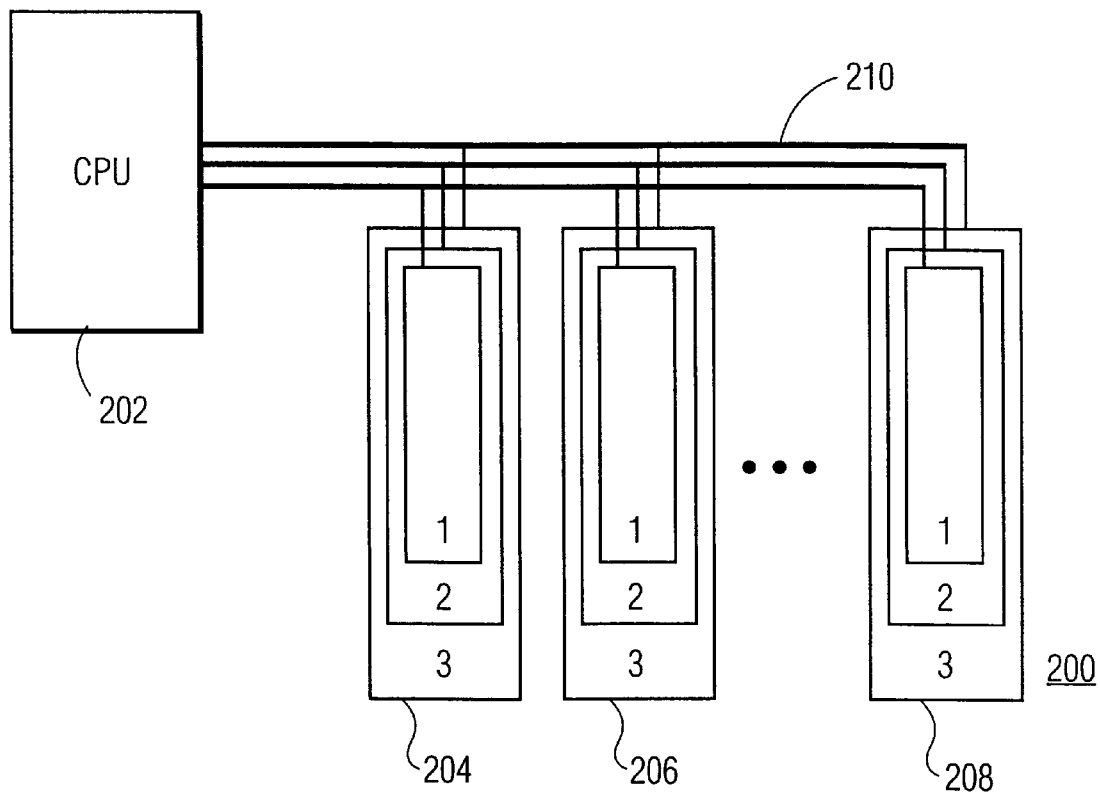
FIG. 2 is a block diagram of a system with a sliced memory hierarchy in the invention.

FIG. 2 is a block diagram illustrating how the embedded storage structure of the data storage is used as a component or as a slice of a system 200 with a larger storage hierarchy. System 200 comprises a CPU 202, and multiple data storage modules 204, 206, . . . , and 208 that are connected to CPU 202, e.g., via a bus 210. Each of modules 204–208 has, in this example, three storage levels. Level 3 represents the storage provided by, e.g., an optical disk such as disk 104. Level 2 represents the storage provided by, e.g., a magnetic disk such as magnetic disk 110. Level 1 represents the storage provided by, e.g., a semiconductor RAM such unit 114. Level 1 is embedded in level 2, which in turn is embedded in level 3, as in system 100 in FIG. 1.

Each of modules 204–208 represents a respective storage slice in system 200. In particular, data may be localized to a given hierarchy or spread across several hierarchies. Commands given to such a hierarchy are executed at indicated levels of the storage hierarchy. A command structure where the command field is partitioned into command operation and command level is a specific embodiment of this approach. Here, the command operation is applied to the data locations at the specified storage level. This is further explained with reference to FIG. 3.

System 200 provides a horizontally sliced and vertically nested storage that has a modular architecture. The nesting relates to a faster device with smaller storage capacity that is embedded within a slower device with a larger storage capacity. The slicing relates to multiple nested modules being arranged in parallel. The modularity relates to the extensibility of the system, either by arranging more slices in parallel, and/or by providing one or more additional storage levels to one or more of the slices. System 200 is not restricted to consumer applications. Practical implementations are feasible owing to the increased miniaturization of the storage devices at the various hierarchical levels, e.g, tape drives, magnetic disk drives, optical disk drives and integrated circuitry. Further, the advent of the recordable optical disk allows the optical disk drive to be the staging device for a slower medium, such as a magnetic tape.

Command Format for a Memory Hierarchy

Figures 3, 4:
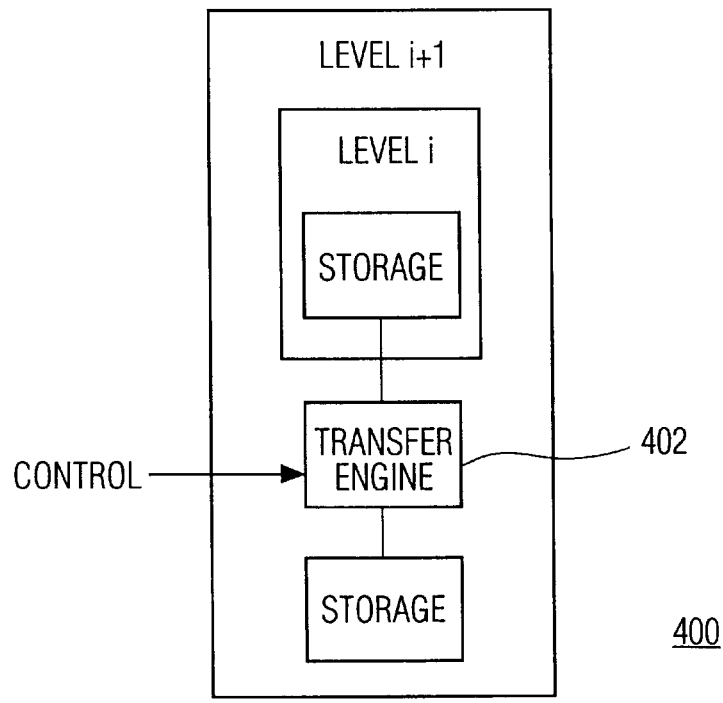
FIG. 3 is an example of a command format for a memory hierarchy in the invention.
FIG. 4 is a block diagram of a control architecture for data transport between successive storage levels.

FIG. 3 shows an example command format 300 where a data object of size "xfer" count at source location (storage levels, data location,) can be manipulated on and moved to destination location (storage level$_d$, data location$_d$). The field "command" specifies, e.g., if data is to be read, written or transferred. The field "control" specifies the level in the hierarchy where the data are to be cached. Data may be passed from level to level and caching may be specified on a level-by-level basis in the command. An N-bit control field in the command may indicate which of N storage levels will cache data that passes through it. Thus, the command or instruction format is tailored to the hierarchical data storage. Fields may be added to the command format shown to address the individual slices 204–208.

Data Transport Among Levels

FIG. 4 shows a control architecture 400 between storage levels I and I+1. Data is moved between storage levels I and I+1 by means of a transfer engine 402. Engine 402 receives commands that are passed down from CPU 202. The host may access data that is striped across hierarchy slices. Commands may be broadcast to all slices 204–208 with the effect that the slices appear as one large slice, commands may be issued individually to hierarchy slices, or commands may be partially broadcast (multicast) to a subset of hierarchy slices as well as individually directed to specified hierarchy slices.

We claim:

1. A data processing system with a hierarchical memory, wherein:
    the hierarchical memory comprises at least one memory module;
    the at least one memory module has a plurality of memory units;
    each respective one of the memory units represents a respective level in a hierarchy of the hierarchical memory;
    each specific one of the memory units is physically integrated with a particular memory unit of a next higher level in the hierarchy of the hierarchical memory;
    among the memory units there are an optical disk drive and at least one magnetic disk drive;
    the magnetic disk drive serves as a read cache for the optical disk drive; and
    the magnetic disk drive is physically integrated with the optical disk drive.

2. The system of claim 1, wherein the hierarchical memory comprises at least two memory modules arranged in parallel.

3. The system of claim 2, wherein a particular one of the memory modules is responsive to a command specifying a command operation to be applied to specific data locations at a specific storage level.

4. The system of claim 1, wherein a specific one of the memory units in at least said one memory module comprises a semiconductor RAM physically integrated with the magnetic disk drive and serving as a further read cache for the magnetic disk drive.

5. The system of claim 4, wherein the hierarchical memory comprises at least two memory modules arranged in parallel.

6. The system of claim 1, wherein said one memory module is responsive to a command specifying a command operation to be applied to specific data locations at a specific storage level.

7. A memory module having a plurality of memory units, wherein:
    each respective one of the memory units represents a respective level in a memory hierarchy;
    each specific one of the memory units is physically integrated with a particular memory unit of a next higher level;
    among the memory units there are an optical disk drive and a magnetic disk drive;
    the magnetic disk drive serves as a read cache for the optical disk drive; and
    the magnetic disk drive is physically integrated with the optical disk drive.

8. The memory module of claim 7, wherein a specific one of the memory units comprises a semiconductor RAM physically integrated with the magnetic disk drive and serving as a further read cache for the magnetic disk drive.

* * * * *